(12) United States Patent
Kieronski

(10) Patent No.: US 6,902,301 B2
(45) Date of Patent: Jun. 7, 2005

(54) APPARATUS FOR PRODUCING A KINETIC LIGHT SCULPTURE AND METHOD FOR USING SAME

(76) Inventor: Robert Victor Kieronski, 37 Catherine St., Newport, RI (US) 02840

(*) Notice: Subject to any disclaimer, the term of this patent is extended or adjusted under 35 U.S.C. 154(b) by 45 days.

(21) Appl. No.: 10/357,548

(22) Filed: Feb. 5, 2003

(65) Prior Publication Data

US 2004/0150999 A1 Aug. 5, 2004

Related U.S. Application Data

(60) Provisional application No. 60/354,167, filed on Feb. 4, 2002.

(51) Int. Cl.[7] .................................. F21V 9/00
(52) U.S. Cl. ...................... 362/311; 362/806; 362/327; 362/343; 362/811
(58) Field of Search ................. 362/806, 327, 362/343, 811, 257, 293, 277, 268, 332

(56) References Cited

U.S. PATENT DOCUMENTS

| | | | | |
|---|---|---|---|---|
| 6,536,922 B1 | * | 3/2003 | Hewlett et al. | 362/290 |
| 6,558,022 B2 | * | 5/2003 | Kawahara | 362/257 |
| 2001/0055209 A1 | * | 12/2001 | Dedoro | 362/293 |

* cited by examiner

*Primary Examiner*—Stephen Husar
*Assistant Examiner*—Anabel Ton
(74) *Attorney, Agent, or Firm*—Barlow, Josephs & Holmes, Ltd.

(57) ABSTRACT

A dynamic light sculpture system and method of use are provided. The system includes an optical element that is coated with an optically active material. The optical element may be arranged by the user/artist proximate a viewing screen. A beam of light is directed obliquely at the optical element to produce both transmitted and reflected secondary beams in a myriad of colors.

13 Claims, 7 Drawing Sheets

APPARATUS FOR PRODUCING A KINETIC LIGHT SCULPTURE AND METHOD FOR USING SAME

CROSS REFERENCE TO RELATED APPLICATIONS

Priority is hereby claimed to commonly owned U.S. patent application Ser. No. 29/138,622 titled "Suspended Optical Element Comprising Part of a Light Sculpture.", now issued as U.S. Pat. No. D457,540 S.

This application claims the benefit of U.S. Provisional Application Ser. No. 60/354,167, filed 04 Feb. 2002.

STATEMENT REGARDING FEDERALLY SPONSORED RESEARCH AND DEVELOPMENT

Not Applicable

REFERENCE TO SEQUENCE LISTING

Not Applicable

BACKGROUND OF THE INVENTION

1. Technical Field

The present disclosure is directed to a kinetic light sculpture and, in particular, to a kinetic light sculpture that includes panels coated with a dichroic material.

2. Related Art

Special effect lighting has been in existence for many years and a variety of devices have been brought forth which produce engaging visual patterns. The public is intrigued by moving lights but continues to be intrigued by what is new, or that which provides a unique and stimulating visual experience. Notable examples of such sculptures include Lava Lamps™ and laser light shows.

The patent literature includes a variety of other optical displays including U.S. Pat. No. 6,011,650 to Parker; U.S. Pat. No. 5,597,231 to Rosset; U.S. Pat. No. 5,467,544 to Trueberg; U.S. Pat. No. 4,814,800 to Lavinsky; U.S. Pat. No. 4,307,528 to Dewees; U.S. Pat. No. 4,250,537 to Roegner et. al.; and U.S. Pat. No. 4,196,461 to Geary.

A first object of the disclosure is to provide a means for the production of a visual experience that is unique, engaging, and attention getting.

A second object of the disclosure is to provide the user with a unique form of light decoration which can be customized to conform to individual aesthetics.

A third object of the disclosure is to create an aesthetic object which may be used to illustrate and teach the behavior of light and the properties of optical elements in a manner that creates beautiful and unique moving patterns.

A fourth object of the disclosure is to create a kit form of the system such that the user may experiment with the components and observe the properties of lenses, dichroic surfaces, holograms, lensed reflectors, mirrors, and other optical elements. The effects of such exploration will be rewarded by the production of a dynamic aesthetic experience.

The disclosure differs from conventional imaging projectors that direct their output substantially orthogonally at a screen. The present disclosure directs light obliquely at optical elements placed directly on the screen (or wall) and through the interaction of the projector with those elements causes a visually surprising collection of light patterns to form.

BRIEF SUMMARY

The device of the present disclosure is directed to a kinetic light sculpture and, in particular, to a kinetic light sculpture that includes panels coated with a dichroic material. The device includes a dynamic source of light which produces light that is directed to an optical element positioned in a selected position on a surface substantially orthogonal to the source of light. The light source preferably produces a dynamic source of structured, collimated light. In preferred embodiments, the light grazes at least one optical element obliquely.

Preferably, at least one optical element is suspended adjacent/proximal to the viewing surface. Preferred optical elements are disclosed in co-pending and commonly owned U.S. patent application Ser. No. 29/138,622. The optical elements are preferably coated with at least one layer of an optically active material such as a reflective material, a Transflective material, or a dichroic material (available from 3M Corp,), and the like. "Transflective", as used herein, means having both transmissive and reflective properties.

The optical elements may be nay shape or size, depending on the desired effect. In a preferred embodiment, the optical elements may be arcuate in shape. In some embodiments, an optical element includes a tension member that may be attached to opposing ends of the optical element, causing the optical element to be bent into the arcuate configuration. Releasing the tension members allows the optical element to revert to a planar configuration, which provides for ease of transportation. Such an optical element also allows variation in the degree of bending. When in planar configuration, the planar optical elements may be shipped flat and assembled on-site into their functional shape prior to usage.

The tension members also allow the optical element to retain its shape, thereby making them lightweight and suspendable while automatically providing for the element's proper orientation with respect to the viewing screen.

Placement of large scale optical elements directly onto a screen or viewing surface is used to generate colors and patterns on the surface.

The design and usage of a special purpose projection system is intended to cast approximately collimated beams of light obliquely onto the optical surfaces. The projection system may be implemented with a plurality of individual projected beams with a means for directing the beams radially from their point of origin. Special purpose embodiments with features chosen depending upon intended usage or market will generally include a beam source from actual or derived multiple points and motion of the primary beam.

A second utility of the disclosure is that of illustrating, in a vivid manner, certain principles of physical optics that may be otherwise difficult to visualize or comprehend through ordinary experience or book study.

DETAILED DESCRIPTION

The Preferred Embodiment

The present disclosure is directed to a system that provides a dynamic light sculpture by directing a light beam onto an optical element that is coated with an optically active material. The optical element preferably has an arcuate shape and may be positioned proximate a substantially planar viewing surface. Preferably, the light beam is directed to the optical element at an oblique angle to the viewing surface. Before reaching the viewing surface, the primary beam is interrupted by an optical element to produce a derivative light beam. Selection of the oblique angle between the primary beam and the viewing surface allows a portion of the derivative beam to fall upon the viewing surface and consequently to become visible to a viewer. The display is a temporal/spatial display o color and movement of light on the screen. The dynamic movement of the patterns and color changes may be complex and may be synchronized in time with the movements of the primary light beam.

The system may be responsive to sound via a software interface. The optical elements by the various natures of their composition, reflect, refract, filter, and perform other unique physical operations on the light directed obliquely from the projection source. The exact number and arrangement of the optical elements may be chosen by the user of the disclosure. Various arrangement choices made by the user may create a wide range of patterns and effects.

The system may be integrated as a single assembly or may exist as a group of separate components combined as an installation. The system may be formed from a group of separate components networked together. The system may be sold as a kit comprising components for user assembly.

Figure 1:
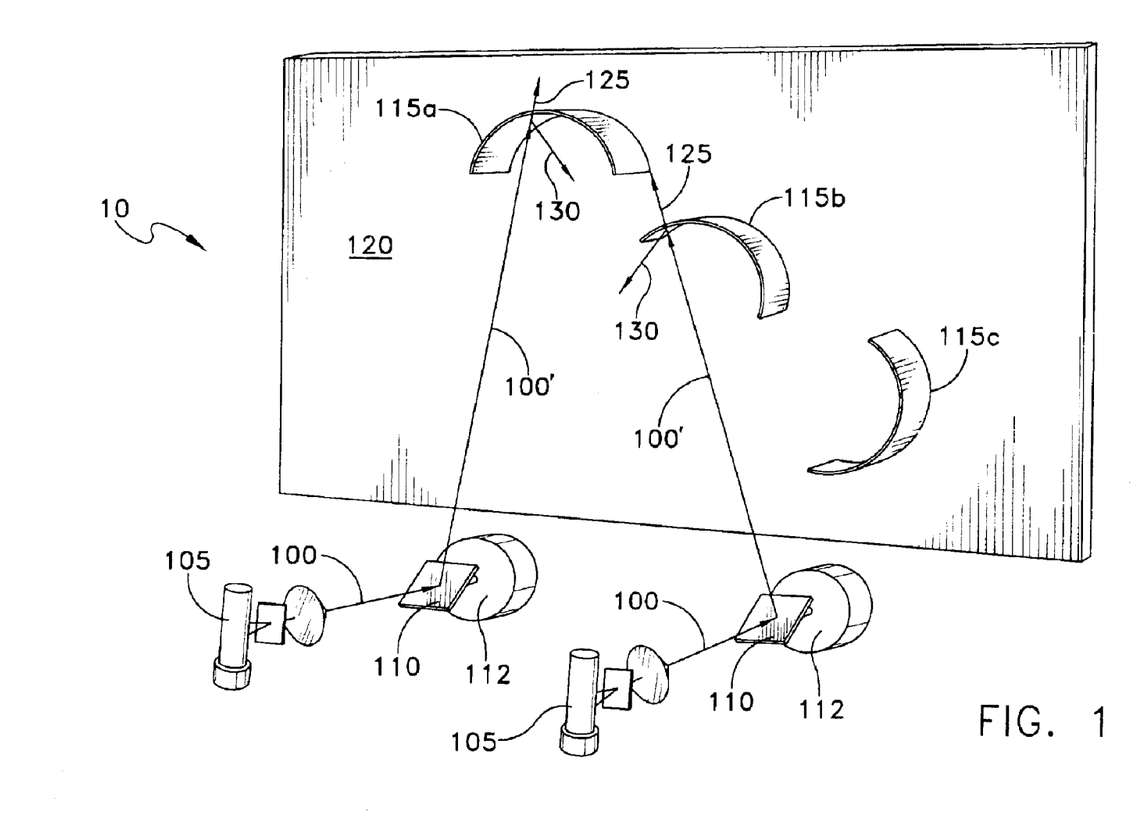
FIG. 1 is a perspective view of an exemplary system according to the present disclosure.
Figure 2:
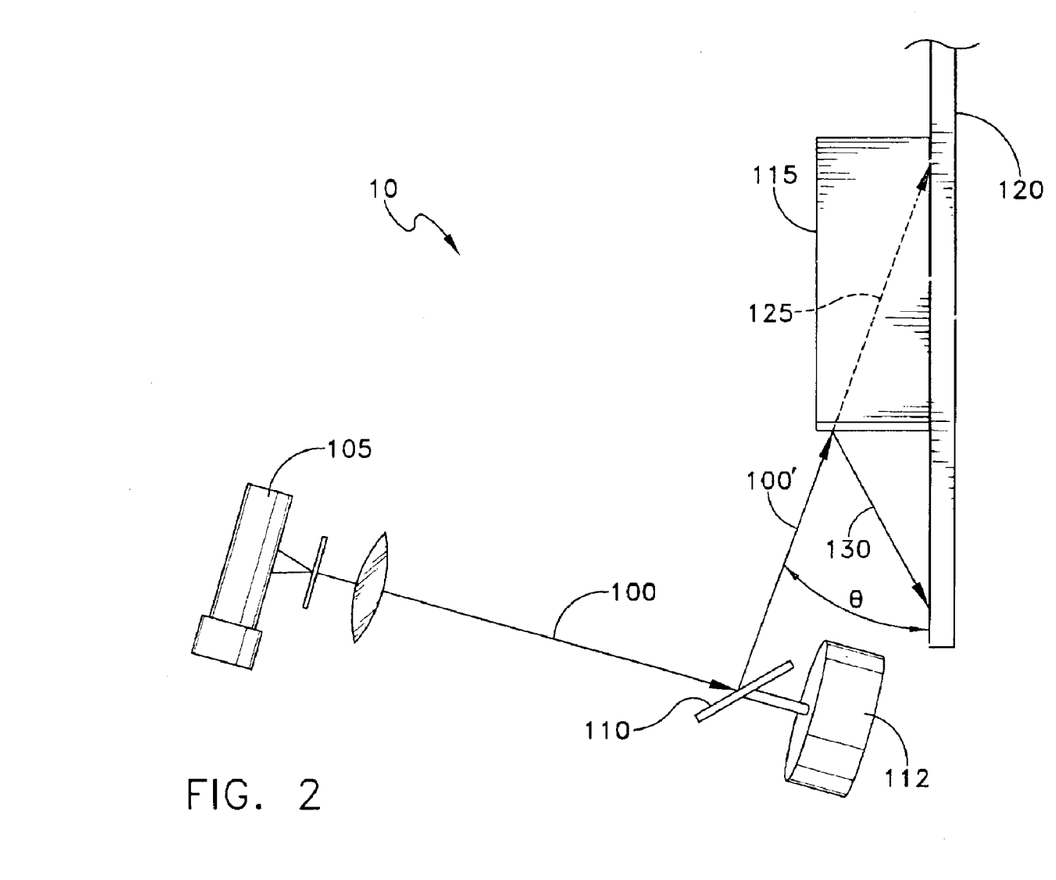
FIG. 2 is a side view of the system shown in FIG. 1.

FIGS. 1 and 2 when taken together illustrate one exemplary system 10 according to the present disclosure. As shown, system 10 includes light sources 105, mirrors 110 adapted to be controlled by a motor 112, a viewing surface 120, a plurality of optical elements 115 proximate viewing surface 120, and a power source (not illustrated). Preferably, viewing surface 120 may be substantially planar, such as a wall or diffusely reflecting surface. As shown, optical elements 115 are positioned proximate viewing screen 120. Optical elements may be positioned proximate viewing screen 120 by any method including by suspension, by adhesion, by magnets, by mild adhesive, or by electrostatic attraction. The shape of optical elements 115 may vary from planar to highly curved, with an arcuate shape being preferred.

Light sources 105 may be any source of light in the visible spectrum as, for example, a light bulb.

Motor 112 may be any type of motor that can be adapted to move mirrors 110 such as, for example, a servo motor with cams.

Figure 3:
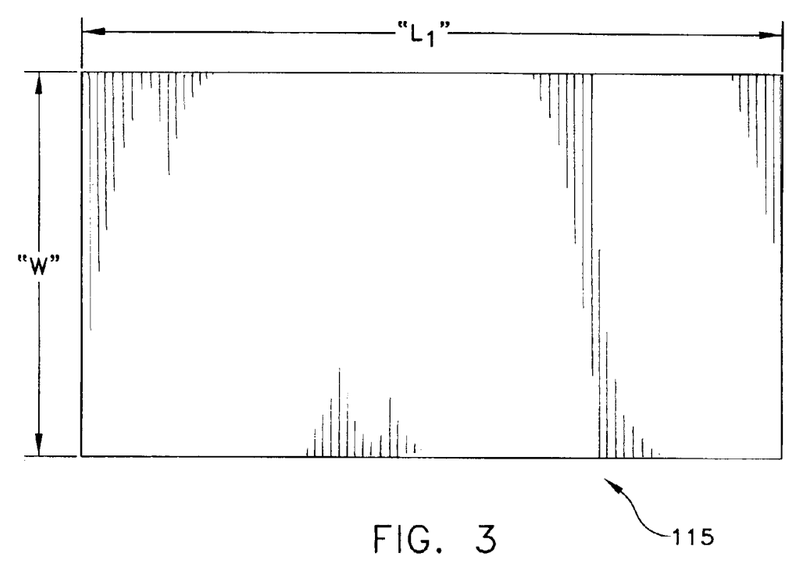
FIG. 3 is a top view of an optical element of the system of FIG. 1.
Figure 4:
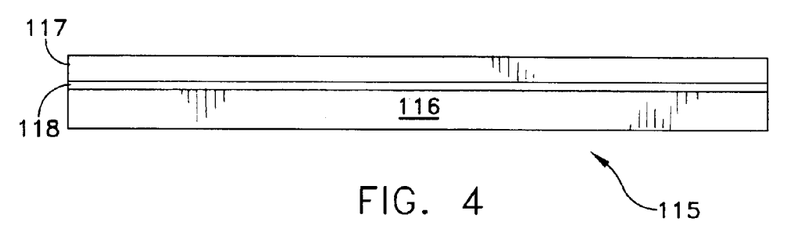
FIG. 4 is a side view of the optical element shown in FIG. 3.

FIGS. 3 and 4, when taken together, show optical elements 115 in greater detail. In the present embodiment, each optical element 115 is substantially planar and has a substantially rectangular shape having a length "L1" and a width "W". The size of the optical element may vary from credit card size to billboard size, in accordance with the scale of the sculpture. By varying the degree of curvature of the optical element, the cylindrical focal distance of the optical element may be varied as well. Although illustrated herein as rectangular in shape, other shapes may be used depending upon the desired effect. For example, changing the shape of the substrate would allow one to select a different axis orientation, if desired.

As shown in the side view of FIG. 4, optical element 115 includes a substrate 116, which may be a transparent material such as plexiglass. Substrate 116 may include a film 117 on one or both sides. Film 117 may be applied directly to substrate 116, by a process, for example, lamination, using a transparent adhesive or binding layer 118 such as, for example, glue. Film 117 preferably may be formed from or include any optically active material such as, for example, a dichroic, reflective, or refractive material. One preferred unitary film 117 is a dichroic film commercially available under the product name, "3M Radiant Light Film" from 3M Corporation.

Transmissive and reflective colors may vary. The degree of reflectivity may vary (i.e. some elements may be totally reflective). Elements may include refractive properties such as given by holograms or fresnel optics. Elements may be broken into short, flat segments to form a curve or may contain facets.

Suspending optical elements allows them to be self-orienting such that their cylindrical axes fall substantially perpendicular to the screen 120.

Figure 5:
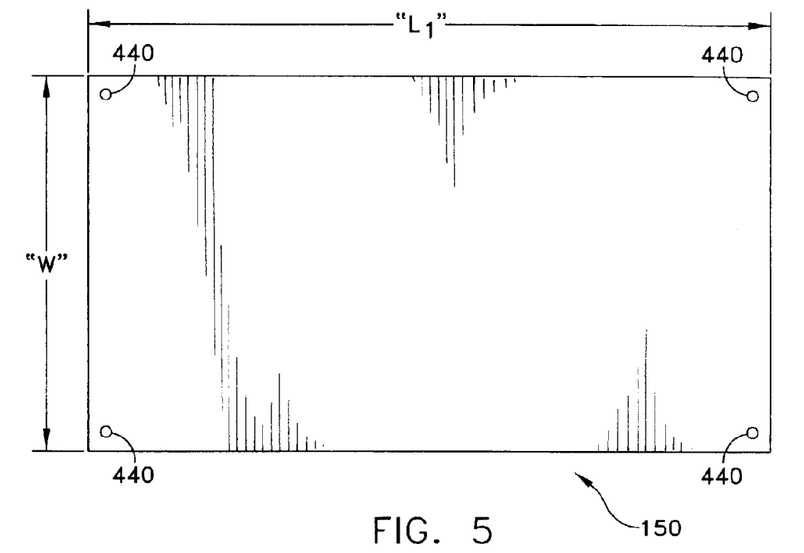
FIG. 5 is a top view of another embodiment of an optical element adapted for suspension.
Figure 6:
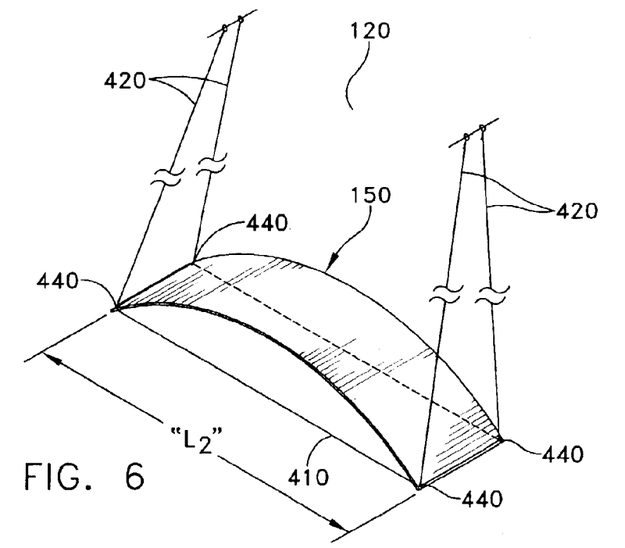
FIG. 6 is a perspective view of the optical element shown in FIG. 5.

FIG. 5 shows another embodiment of an optical element 150 that includes apertures 440 for receiving tension members. Length "$L_1$" is the length of element 150. FIG. 6 shows the element 150 of FIG. 5 with the addition of tension members 410 and suspension members 420. Preferably tension members 410 and suspension members 420 may be formed from a transparent material such as, for example, monofilament fishing line. Tension members 410 may be threaded through the plurality of apertures 440 as shown, to provide an arcuate configuration to optical element 150. Adjusting length $L_2$, by changing the tension of element 410, varies the degree of curvature, and hence the cylindrical focal distance of 150. Preferably, $L_2$ is shorter than $L_1$.

Because the arcuate shape of optical elements may be varied, release of tension members allows optical elements to assume a planar configuration, which provides for ease of storage and shipment. When prepared for use, the tension cord 410 may be strung in a continuous closed loop around the periphery of the element 150 by re-joinably fastening the ends of tension cord 410 using a hook, snap, or other re-joinable fastener.

Referring again to FIG. 1 and FIG. 2, when the system is in use, light sources 105 generate primary beams 100 which are directed onto mirrors 110. Mirrors 110 rotate under the control of motor 112 in any selected direction, allowing redirection of primary beam 100. As mirrors 110 move, reflected primary beam 100' is intermittently directed onto optical elements 115 at a selected angle θ. As reflected primary beam 100' reaches each optical element 115, it may be split into a plurality of derivative beams, shown in the present embodiment as a transmitted light beam 125 and a reflected beam 130. As the primary reflected beam 100' moves, so do the derivative beams (i.e., transmitted beam 125 and reflected beam 130). Depending on the coating of optical element 115, primary reflected beam 100' may be filtered by the properties of optical element 115 to include light having specific wavelengths (i.e., colors) that are dependent upon the angle of incidence between the reflected primary beam 100' and the surface of the optical element 115, resulting in a transmitted beam 125. Alternatively, light that is not transmitted through optical element 115 may form a reflected beam 130 that includes light having wavelengths complementary to the transmitted wavelengths that form the transmitted beam 125.

The curvature of the optical element 115 acts to focus reflected beam 130 to a point in space that is dependent upon the incident angle between primary beam 100 and the particular portion of optical element 115 where the beam may be striking.

Selection of an oblique angle θ between primary reflected beam 100' and viewing screen 120 allows a portion of the derivative beams (i.e., transmitted beam 125 and reflected beam 130) to fall upon surface 120 and consequently become visible to a viewer. The remaining portions of beams 125 and 130 again may be intercepted by placing additional optical elements in positions to intercept beams 125 and 130. By so doing, successive derivative beams may be formed to expand the sculpture.

The addition of successive optical elements 115 at selected positions proximate viewing surface 120 may provide new derivative colors and result in additional unique beam motions. Because of low losses experienced in the optical elements, the process may be continued for multiple steps to produce richly complex and brilliant moving patterns on the viewing surface. The combined effect of several swept beams coming from multiple origins produces a multiplicative complexity on the screen that enhances the aesthetic experience.

Once set-up, the system may continue to run autonomously through a built-in microprocessor or may be synchronized to a sound source such that the light patterns generated on the viewing surface are responsive to the sound source, such as a music beat.

Figure 7:
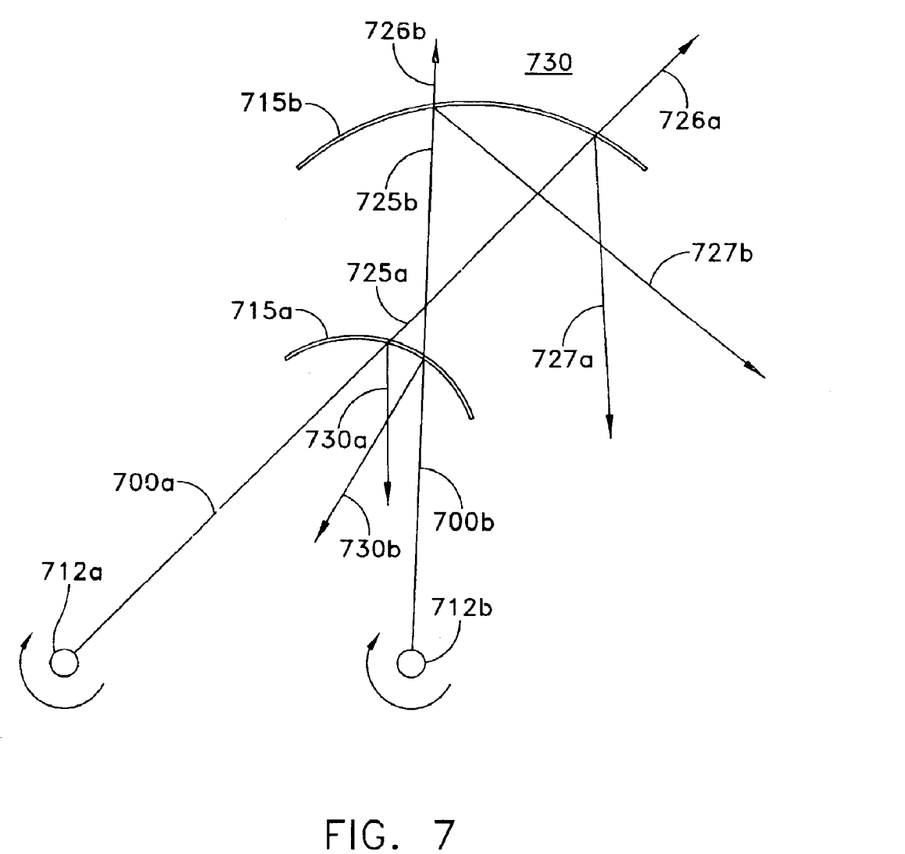
FIG. 7 is a schematic of the light beams of an exemplary system.

The operation of such a system is illustrated schematically in FIG. 7. As shown, items 712a and 712b may be sources of light creating beams 700a and 700b. Preferably, the light source produces collimated light, which enhances the visual display. These beams strike the first dichroic transflector 715a splitting each beam into a reflected portion and a transmitted portion. Items 730a and 730b may be the two reflected portions of beams 700a and 700b. Items 725a and 725b may be the transmitted portions of beams 700a and 700b. Typically, both the transmitted and reflected beams may be utilized for secondary interaction with other optical entities. In this figure, beams 725a and 725b may be shown striking a second optical element 715b resulting again in both transmitted beams 726a and 726b and reflected beams 727a and 727b. The viewing surface 730 may be located parallel to this page and behind the projector and optical elements. In three dimensions, the light beam from the projector may be aimed slightly toward the screen such that it begins to hit the screen at approximately the point where it strikes the first optical element. In this way, both a portion of the reflected and transmitted beam strike the viewing surface. If the beams emanating from sources 712a and 712b move such that they sweep across the optical elements, complex patterns emerge on the viewing surface.

Alternate Embodiment

Figure 8:
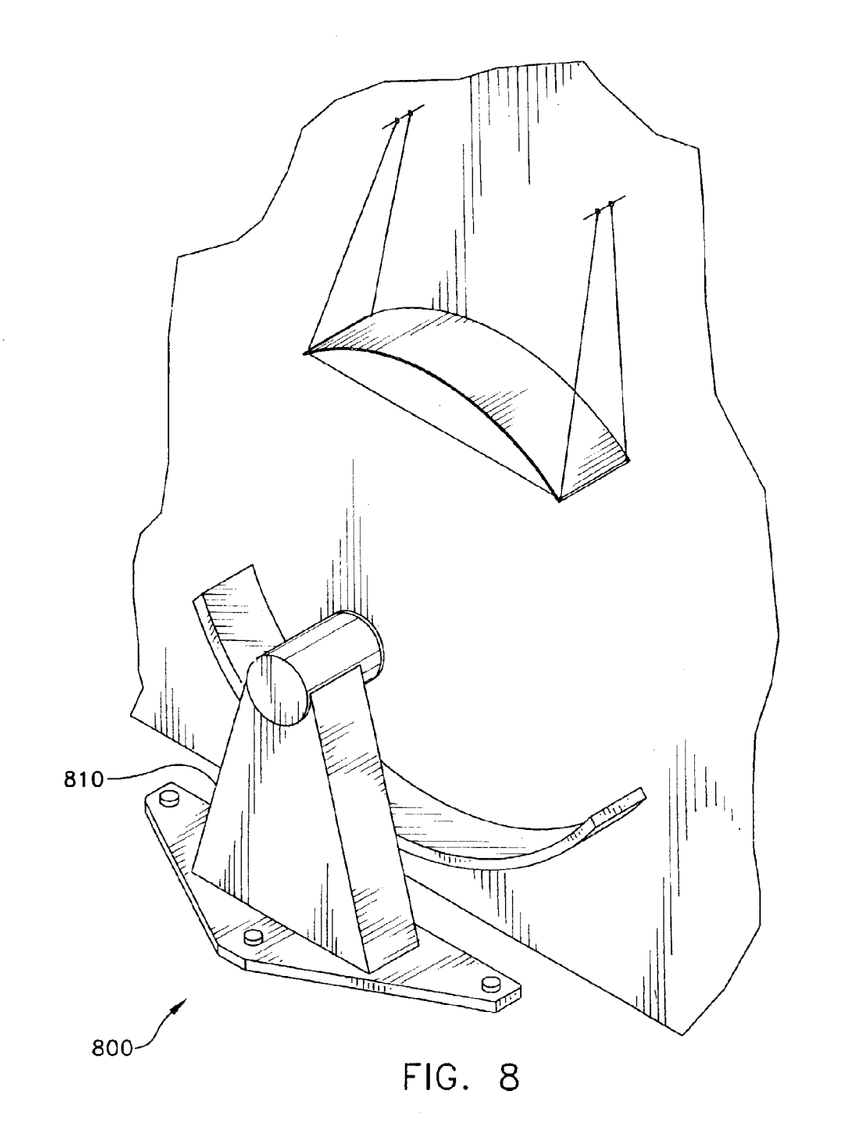
FIG. 8 is a perspective view of an alternate embodiment of a system according to the present disclosure.
Figure 9:
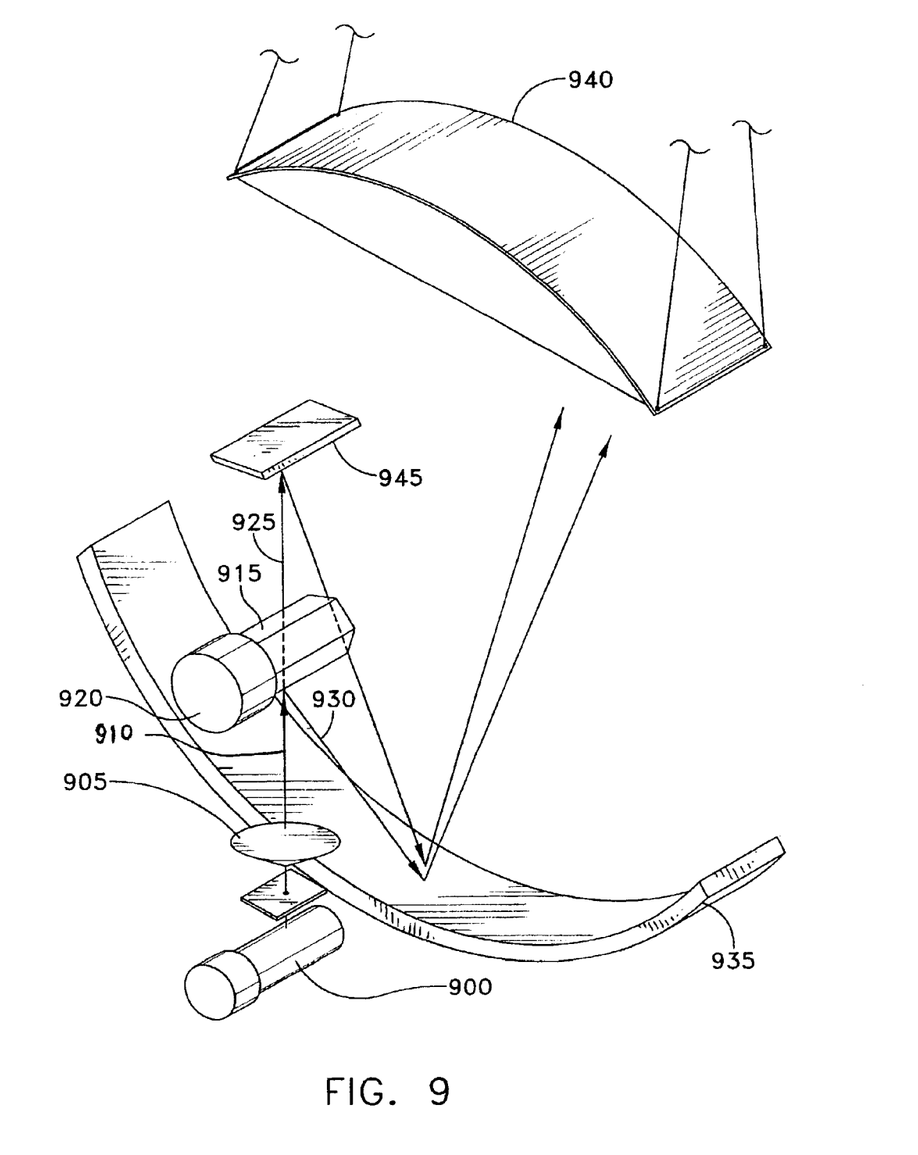
FIG. 9 is a schematic perspective view of the system of FIG. 8 showing light paths through the projection device.

Another embodiment of a system according to the present embodiment is illustrated in FIG. 8. As shown, system 800 uses a single light projector 810. FIG. 9 shows a perspective schematic view of the projector of FIG. 8 with the cover removed. Light generated by light source 900 goes through collimating optics 905 and shines a light beam 910 onto a movable array 915 consisting of dichroic filters and spaces arranged in a prismatic assembly. The array may be on a shaft rotated by a stepper motor 920. Control of the stepper motor may be by electronic circuitry that may cause rotation in response to music or other stimuli. Upon striking a dichroic filter, the original light beam 910 may be split into a transmitted portion 925 and a reflected portion 930. The reflected portion goes downward where it strikes a large curved reflector 935 and may be directed obliquely towards optical element 940. The transmitted portion 925 travels upward and may be re-directed by mirror 945 downward to strike curved reflector 935 whence it may be redirected obliquely towards optical element 940.

As array 915 may be rotated, the reflected beam 930 strikes different portions of the curved reflector 935. When it is redirected by 935, beam 930 appears to be arriving at the screen from different points of origination. Because the angle between the original beam 910 and the filters in array 915 may be constantly changing, the color of the beam may also be changing. In this manner, a multiplicity of light beams coming from a multiplicity of different origins may be made to emanate from a single source oblique projection system. Light beams from this embodiment of the oblique projector may then be used to strike optical element 940 suspended on the screen in a manner similar to that of the embodiment described earlier.

The system may exist in a number of alternate embodiments and variants that may be used singularly or combined for any particular embodiment.

I claim:

1. A light sculpture system, comprising:
   (a) a light source obliquely directed to
   (b) an optical element made of a dichroic film assembly suspended proximal to
   (c) a viewing surface, wherein light from said source is transmitted, reflected, or refracted by said element to produce unique patterns visible on said viewing surface with said optical element formed in an arcuate shape, whereby the element will rest in a desired orientation when suspended proximal to the viewing surface.

2. A light sculpture system according to claim 1, which uses a tension member to maintain said arcuate shape.

3. A light sculpture system according to claim 2, which uses a re-joinable fastener to join the ends of said tension member, thereby maintaining tension.

4. A light sculpture system according to claim 1, having a plurality of said optical elements.

5. A light sculpture system according to claim 4, wherein a portion of said optical elements utilizes derivative light beams emanating from other optical elements within the light sculpture.

6. A light sculpture system according to claim 1, wherein said light source emits a collimated beam.

7. A light sculpture system according to claim 1, wherein said light source is plural in number.

8. A light sculpture system according to claim 1, whereby the beam from said light source is dynamically redirectable by a redirection means.

9. A light sculpture system according to claim 1, with all components in a compact or partially assembled form to facilitate shipment.

10. A light sculpture system, comprising:
(a) a collimated light source directed to
(b) a movable array of dichroic filters and spaces wherein light is directed onto
(c) a curved reflector, and thence obliquely onto
(d) an optical element suspended proximal to
(e) a viewing surface, wherein light from said source is transmitted, reflected, or refracted by said element to produce unique patterns visible on said viewing surface and wherein said optical clement is formed in an arcuate shape and a tension member is used to maintain said arcuate shape, whereby the optical element rests in a desired orientation when suspended proximal to tho viewing surface.

11. A light sculpture system according to claim 10, which uses a re-joinable fastener to join the ends of said tension member, thereby maintaining tension.

12. A light sculpture system according to claim 10, whereby the beam from said light source is dynamically redirectable by a redirection means.

13. A light sculpture system according to claim 10, having a plurality of optical elements.

* * * * *